C. D. LANE & A. F. SCHMAND.
CANDY CUTTER.
APPLICATION FILED FEB. 13, 1908.
911,410.
Patented Feb. 2, 1909.
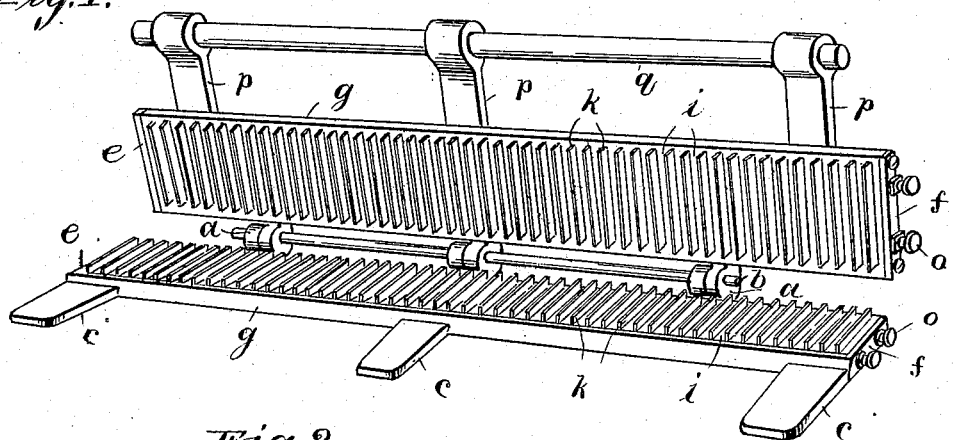
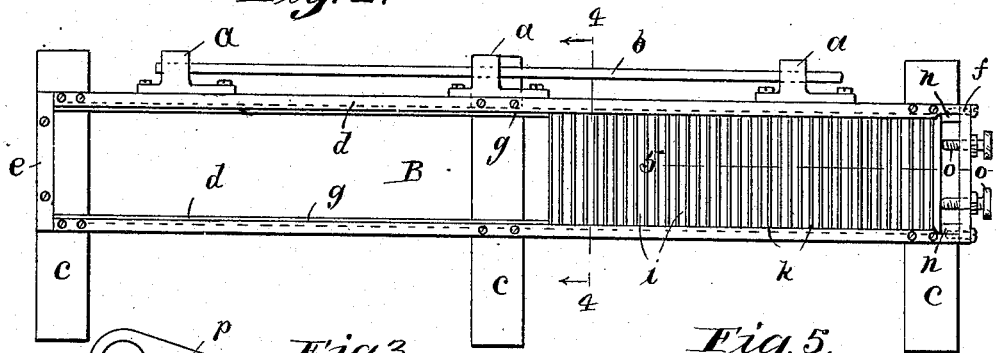
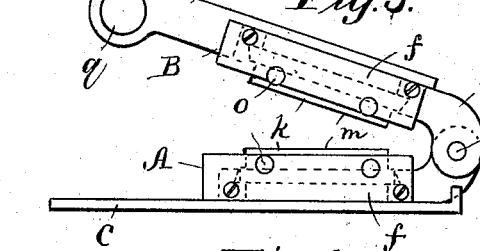
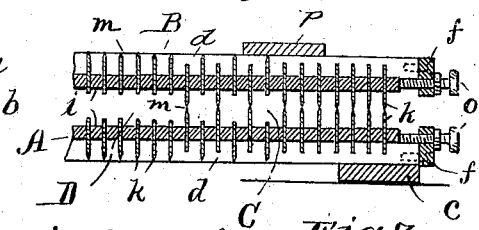
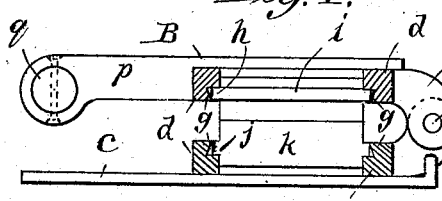
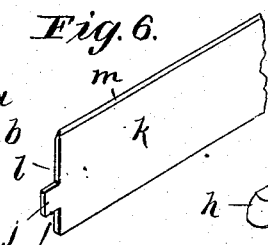
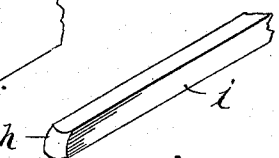
Witnesses
Ruth Raymond.
Elbert O. Hull.
INVENTORS
Charles D. Lane and
Albert F. Schmand
By Chamberlain & Newman ATTORNEYS

UNITED STATES PATENT OFFICE.

CHARLES D. LANE AND ALBERT F. SCHMAND, OF BRIDGEPORT, CONNECTICUT.

CANDY-CUTTER.

No. 911,410.     Specification of Letters Patent.     Patented Feb. 2, 1909.

Application filed February 13, 1908. Serial No. 415,672.

*To all whom it may concern:*

Be it known that we, CHARLES D. LANE and ALBERT F. SCHMAND, citizens of the United States, and residents of Bridgeport, in the county of Fairfield and State of Connecticut, have invented certain new and useful Improvements in Candy-Cutters, of which the following is a specification.

Our invention relates to improvements in confectioners' tools and more especially to a candy cutter so called, and comprises an implement designed to cut strips of boiled candy while in a soft or pliable state, into comparatively short lengths, as for instance in the formation of butter-cups, kisses and various other lengths and shapes.

It is the object of our invention to provide an improved construction of candy cutter which is adapted to cut strips of soft candy into various lengths and shapes, and to do it in a practical and expeditious manner; to construct the machine in such a way as to permit some or all the blades to be shifted out of the way for forming the longer pieces or for forming and imprinting flat bars to produce special designs and shapes, and further to provide a light and durable machine which may be inexpensively constructed from cold roll steel, in a way to insure it against warping.

With the above objects in view, we have devised the simple and novel construction shown upon the accompanying sheet of drawings forming a part of this specification, upon which similar characters of reference denote like or crorresponding parts throughout the several figures and of which, Figure 1, shows a perspective view of our improved candy cutter, in an open position. Fig. 2, is a plan view of the base section of the machine, with upper or movable section and part of blades removed. Fig. 3, is an end view of cutter, drawn upon a somewhat larger scale. Fig. 4, is also an enlarged, cross sectional view, of our cutter taken on line 4—4 of Fig. 2. Fig. 5, is a detailed longitudinal sectional view of a part of the cutter taken on line 5 of Fig. 2. Fig. 6, is a further enlarged detailed perspective view of the end portion of one of the cutters detached, and Fig. 7, is a similar enlarged perspective view of one of the intermediate filling blocks detached.

As will be readily seen our cutter is constructed of two parts hinged together, the lower or bottom section A, being stationary while the upper section B is adapted to swing open and close as in the act of cutting candy. These sections are provided with suitable hinges along the rear side, which preferably comprise special shaped brackets $a$ bolted to the respective sections and adapted to aline with each other, and drilled to receive a suitable pivotal rod $b$ as shown.

From an inspection of the drawings it will be noted that the two sections of the cutter are substantially alike except that the bottom section is provided with base plates $c$ while the upper sections have arms $p$ in which the handle $q$ is mounted. The construction of frame, block and blades are the same in both instances, and consequently similar reference characters are applied to both. Each section comprises longitudinal blade supporting side strips $d$ and end pieces $e$ and $f$, which are secured in one case to the base plates $c$ while in the other section they are attached to the arms $p$. The said longitudinal strips $d$ are milled out as shown in Fig. 4, to form longitudinal undercut or dovetailed grooves $g$ in their inner sides to receive the beveled ends $h$ of the spacing blocks $i$ and likewise to support the ends $j$ of the blades $k$. These blades and blocks are designed to be arranged and supported crosswise, side by side in their frames, as shown at the extreme right of Figs. 2 and 5, to cut candy into very short lengths, while if longer lengths were required every alternate blade in the sections would be inverted and thus lowered as shown at C in Fig. 5, which would produce pieces of candy of double the length. If all the blades are inverted as seen at D a special plate (not shown) can be laid on the back edge of the blades to form a working surface upon which special shapes or flat candy bars can be formed. The notches $r$ in lower corner of blade serve to accommodate the shoulder formed by grooves $g$ and allow the ends $j$ to rest thereon. The upper corners of each end of the blades are also cut away as at $l$ to allow the blades to be inverted and the sharp edge $m$ to be placed down between the sides $d$ and the back edge finish above the faces of frame and blocks. As for instance if it were desired to cut pieces of candy of twice the length, we would turn down every other blade, while if we desired the pieces three times as long only every third blade would be used. The overhang of dove-tail at one end of bars $d$ are cut away as at $n$ to allow the blocks $i$ to be inserted, after which they are shoved along the ways to position, and the blades inserted therebetween. After the frame is filled in this manner the blades and blocks are secured in position by means of the end screw $o$—$o$ in plate $f$ which are adapted to be adjusted against the said parts as shown in Fig. 2.

In the operation of our cutter a suitable stripper, or lifter (not shown) is first laid over the blades of the lower section, after which the candy is placed thereon, and then the upper section is manually lowered and its blades forced into the candy, each blade obviously cutting in conjunction with the corresponding blade of the lower section, with which it registers. After the said upper section has been lowered in this manner to sever the candy it is again raised and the severed pieces of candy removed by the assistance of the lifter which is raised in a way to strip and gather the candy from the blades, and further serve for its removal to a suitable receptacle.

Having thus described our invention what we claim and desire to secure by Letters Patent is:—

1. A candy cutter, comprising two frame sections, hinged together and each having a pair of longitudinal undercut grooves and forming shoulders, blades supported upon said shoulders, spacing blocks arranged between the blades having beveled ends to engage the shoulders, and a pair of adjustable screws mounted in the ends of the frame to press against the blades and blocks.

2. A candy cutter, comprising two frames hinged together, and each consisting of side and end pieces secured together, said side pieces having an undercut groove along their inner edge, blades supported upon a shoulder formed by the grooves, spacing blocks also supported upon said shoulders and having beveled ends to engage the undercut portion of the sides to prevent the blocks from coming out, and screws in end of frame to engage the blocks or knives to bind and secure the same.

Signed at Bridgeport, in the county of Fairfield, and State of Connecticut, this 10th day of February, A. D., 1908.

CHARLES D. LANE.
ALBERT F. SCHMAND.

Witnesses:
C. M. NEWMAN,
RUTH RAYMOND.